United States Patent
Das Sharma

(10) Patent No.: US 10,784,986 B2
(45) Date of Patent: Sep. 22, 2020

(54) FORWARD ERROR CORRECTION MECHANISM FOR PERIPHERAL COMPONENT INTERCONNECT-EXPRESS (PCI-E)

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 15/640,449

(22) Filed: Jun. 30, 2017

(65) Prior Publication Data
US 2018/0248650 A1 Aug. 30, 2018

Related U.S. Application Data

(60) Provisional application No. 62/464,771, filed on Feb. 28, 2017.

(51) Int. Cl.
*H04L 1/00* (2006.01)
(52) U.S. Cl.
CPC ............ *H04L 1/0018* (2013.01); *H04L 1/007* (2013.01); *H04L 1/0009* (2013.01); *H04L 1/0017* (2013.01); *H04L 1/0057* (2013.01)
(58) Field of Classification Search
CPC .... H04L 1/0018; H04L 1/0009; H04L 1/0017
See application file for complete search history.

(56) References Cited

U.S. PATENT DOCUMENTS

| 6,400,728 B1 * | 6/2002 | Ott | H03M 13/09 370/310 |
| 2005/0160346 A1 * | 7/2005 | Yamane | H03M 13/2707 714/776 |
| 2009/0201805 A1 * | 8/2009 | Begen | H04L 1/0009 370/225 |
| 2011/0134909 A1 * | 6/2011 | Huang | H04L 1/0009 370/352 |
| 2015/0256288 A1 * | 9/2015 | Tanaka | H04L 1/004 714/776 |
| 2016/0099795 A1 * | 4/2016 | Lusted | G06F 11/10 714/776 |

(Continued)

FOREIGN PATENT DOCUMENTS

WO 2015099724 8/2015

OTHER PUBLICATIONS

International Preliminary Report on Patentability issued in International Patent Application No. PCT/US2018/019583, dated Sep. 3, 2019; 12 pages.

(Continued)

*Primary Examiner* — Joseph D Torres
(74) *Attorney, Agent, or Firm* — Alliance IP, LLC

(57) ABSTRACT

Aspects of the embodiments are directed to systems, methods, and devices that can activate forward error correction (FEC) based on the channel loss of a channel. The channel's loss can be characterized as a high loss channel if the channel loss exceeds a predetermined threshold value. For channels with high loss and for those that operate at high data rates (e.g., data rates commensurate with PCIe Gen 4 or Gen 5), FEC can be activated so that the channels can achieve higher data rates.

21 Claims, 12 Drawing Sheets

(56) References Cited

U.S. PATENT DOCUMENTS

2016/0337079 A1 11/2016 Ran
2016/0377679 A1 12/2016 Froelich et al.
2017/0017604 A1 1/2017 Chen et al.

OTHER PUBLICATIONS

International Search Report and Written Opinion in International Application No. PCT/US2018/019583, dated Jun. 5, 2018, 13 pages.
Yao, Jun et al., "PCIe Gen4 Standards Margin Assisted Outer Layer Equalization for Cross Lane Optimization in a 16GT/s PCIe Link", In: Conference of DesignCon 2017—Feb. 2, 2017, Retrieved from https://www.researchgate.net/publication/316009959, 27 pages.

* cited by examiner

# FORWARD ERROR CORRECTION MECHANISM FOR PERIPHERAL COMPONENT INTERCONNECT-EXPRESS (PCI-E)

CLAIM OF PRIORITY

This application claims the benefit pursuant to 35 U.S.C. § 119(e) to U.S. Provisional Patent Applications having U.S. Ser. No. 62/464,771, filed on Feb. 28, 2017, the entirety of which are incorporated by reference herein.

FIELD

Various embodiments generally may relate to the field of channel latency.

BACKGROUND

Data centers deploy tens of thousands of nodes, working collaboratively on certain tasks, with each node having multiple high-speed data links (such as Peripheral Component Interconnect Express (PCIe) data links). The nodes demand a predictable performance across all their components/interconnects, including those with PCIe links. As part of that predictable performance guarantee, some data center customers are demanding high bit error rates (BER) while also demanding high speed/low latency.

DETAILED DESCRIPTION

Figure 1:
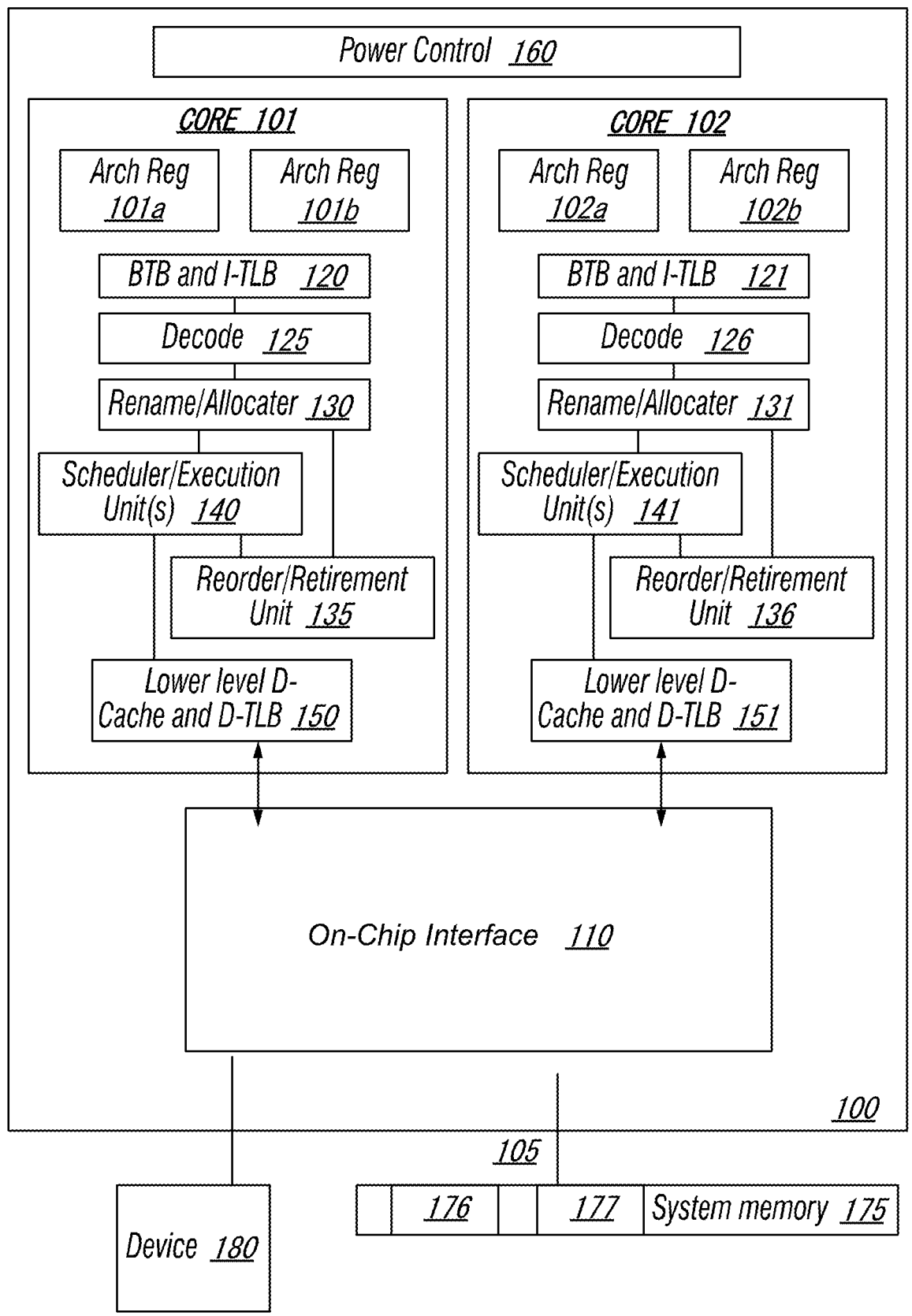
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point Link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Embodiments of the present disclosure may enable the next speed upgrade for PCI Express (PCIe) beyond PCIe Gen 4 (e.g., PCIe Gen 5) at a lower BER (bit error rate) by the optional use of forward error correction (FEC). FEC can extend the channel reach while maintaining full backwards compatibility, even in the presence of retimer(s). Embodiments herein may allow for components to use the optional FEC if a corresponding receiver is unable to deliver the specified $1 \times 10^{-12}$ BER for the channel constraints with minimal changes to the legacy 128b/130b encoding/framing rules. This allows system designers to increase the channel length before being required to put down a retimer, paying a latency overhead of FEC only if one of the components is unable to deal with the longer channel length.

Aspects of the embodiments may relate to PCIe 5.0 or higher using FEC in a backwards compatible manner, if needed. Implementation choices may include one or more of the following:

Two sets of channel losses: a lower loss scenario (e.g., <30 dB) that does not activate FEC by any receiver; and a higher loss scenario (e.g., 30-35 dB), where some components may request FEC for operating at the higher data rate. These capabilities as well as the channel loss of each sub-Link will be communicated to the upstream and downstream port. Each port can then independently decide if it can deal with the cumulative latency adder due to FEC in each sublink at the higher data rate or run at 16 GT/s or below (Gen 1-4).

Only data blocks are covered by FEC; data blocks are received at predetermined intervals.

The ordered sets during L0, as well as the transition between ordered sets and data blocks, are governed by redundancy to correct bit flips without causing unnecessary retraining of the Link.

Figure 2:
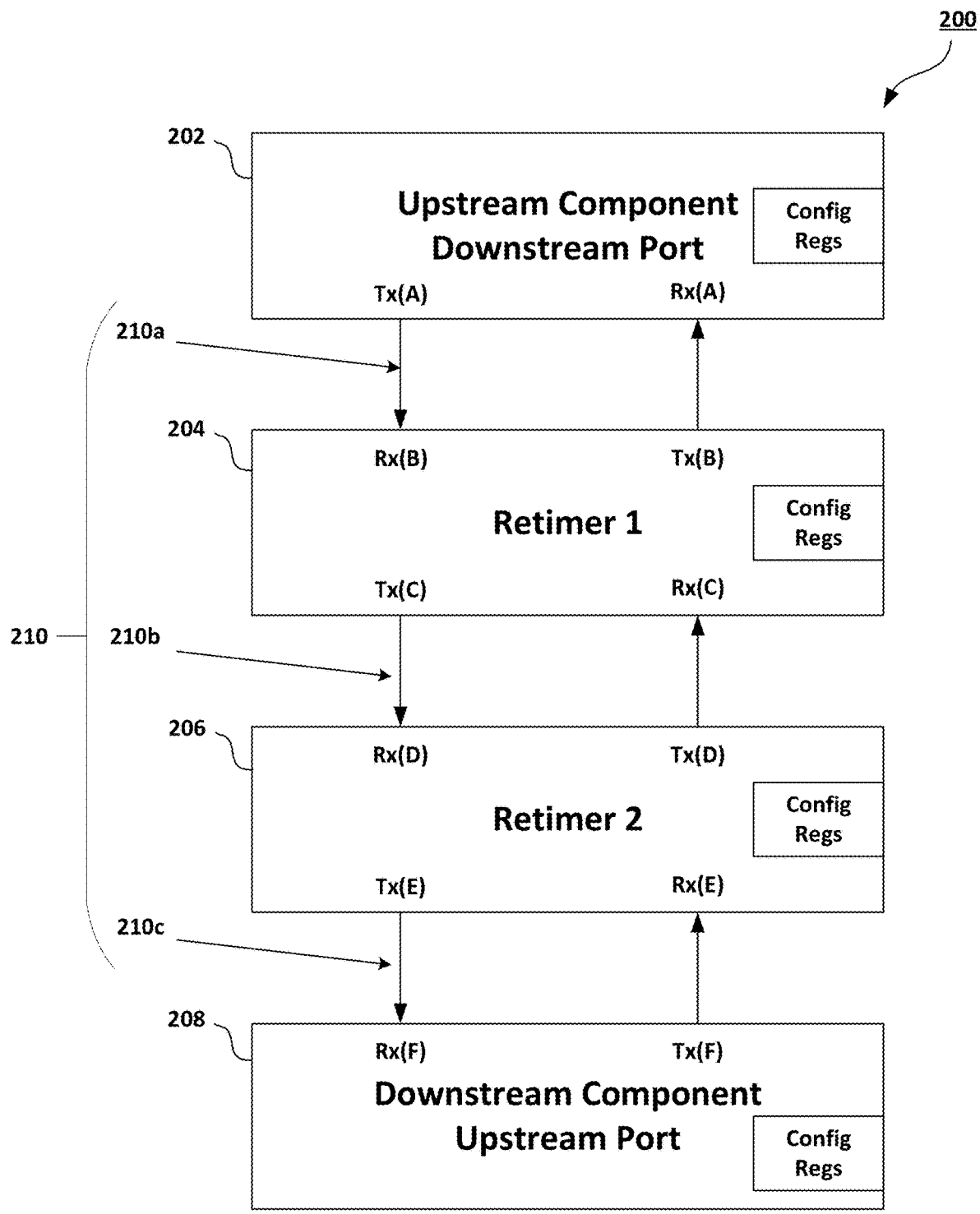
FIG. 2 is a schematic diagram of an interlinked system that includes two retimers in accordance with embodiments of the present disclosure.

FIG. 2 is a schematic and timing diagram illustrating a sample topology 200 with two re-timers 204 and 206 between an upstream component 202 and a downstream component 208 in accordance with embodiments of the present disclosure. The upstream component 202 can be a PCIe compliant device, such as a CPU or other device capable of generating a data packet and transmitting the data packet across a data Link compliant with the PCIe protocol. The downstream component 208 can be a peripheral component that can receive a data packet from a Link compliant with the PCIe protocol. It is understood that the upstream component 202 and the downstream component 208 can transmit and receive data packets across a PCIe Link.

The topology 200 can include one or more re-timers 204 and 206. A re-timer 204 and 206 can serve as a signal repeater operating at the physical layer to fine tune the signal from the upstream component 202 and/or the downstream component 208. A re-timer can use Continuous Time Linear Equalization (CTLE), Decision Feedback Equalization (DFE), and transmit an impulse response equalization (Tx FIR EQ, or just TxEQ). Re-timers are transparent to the data Link and transaction layers but implement the full physical layer. In embodiments, the re-timers 204 and/or 206 can include one or more deframer logic 216 and error log 218 and deframer logic 220 and error log 222, respectively.

The upstream component 202 can be coupled to re-timer 204 by a multi-Lane PCIe Link 210. The multi-Lane PCIe Link is split into three Link segments (LS) in each direction, such as downstream LS 210a, 210b, and 210c.

Embodiments herein may extend the channel reach of PCIe Gen 5 using one or more of following mechanisms:

Two sets of channel losses: a lower one (e.g., <30 dB) that mandates no FEC by any Receiver and a higher one (e.g., 30-35 dB) where a Receiver is permitted to request FEC for operating at the Gen 5 rate. For each sub-Link, the Upstream Component may be responsible for communicating the channel loss. This can be a single bit denoting whether the channel is a lower loss channel (e.g., <30 dB) or a higher loss channel (30-35 dB). For example, in FIG. 1 below, the Downstream Port is responsible for communicating the channel loss for the Tx(A)-Rx(B) and Tx(B)-Rx(A); Retimer 1 for Tx(C)-Rx(D) and Tx(D)-Rx(C), and so on. Embodiments may enhance this and communicate the exact channel loss where the (pseudo)Downstream Port is responsible for communicating the channel loss for the motherboard part of the channel and the (pseudo)Upstream Port is responsible for communicating the channel loss in the add-in-card part of the channel, if applicable.

Each Receiver communicates whether it needs FEC for higher loss channel. This information along with the channel loss information described above can be exchanged in the TS1/TS2 Ordered Set exchange in Recovery leading to Gen 4 Equalization, with dedicated bits per Sub-Link, so that the Upstream and Downstream Ports have the accurate information of the channel loss in each Sub-Link as well as the capability of the Receiver in each SubLink even before the Link starts Gen 4 equalization.

With the information exchange above, each Port can independently determine if FEC needs to be turned on and the number of Receivers that will be using the FEC on the receive path. For example, in the 3 sub-links shown in FIG. 2, the channel between the Downstream Port and Retimer 1 is long and Retimer 1 needs a FEC to operate at Gen 5 Rate; the channels between Retimer 1 and Retimer 2 is short; and the channel between Retimer 2 and the Upstream Port is long and Retimer 2 needs FEC for the longer channels; then the Gen 5 traffic will encounter the FEC latency on two Receivers, if Gen 5 is enabled. The ports can independently decide if that additional latency is acceptable for their applications and decide to advertise (or withhold) Gen 5 Data Rate and perform Equalization when the Link enters Gen 4 Data Rate in Recovery.

Only Data Blocks are covered by FEC. The FEC bits are associated with each Lane and provide coverage for the bits in their Lane. If FEC is turned on and a Receiver needs FEC, it must wait to receive all bits across multiple Data Blocks covered by the FEC, apply the FEC, and then process the bits. Any corrected or detected error must be reported in an error log associated with the Lane. An uncorrectable error detected by the FEC must be treated as a Framing error by a Port and for a Retimer, it must generate Framing Token errors (e.g., corrupted IDL Tokens) or alternatively set a few "poison" bits in the ECC bits, till the Link enters Recovery, so that the error does not propagate. If the ECC bits has "poison" bits, they must be redundant enough to cover the errors (e.g., repeated three times spaced apart by 8 bits or more to deal with burst errors of up to 8 bits) and these bits may or may not be covered by the remaining ECC bits. The Sync Hdr of the Data Blocks may or may not be covered by the ECC bits. If the Sync Hdr bits are not covered by ECC bits, coverage is obtained using other techniques. For example, the Sync Hdr of an Ordered Set (or Data Block)

can be protected through inference since the transitions are preceded by an EDS Token or an SDS Ordered Set.

Figure 3A:
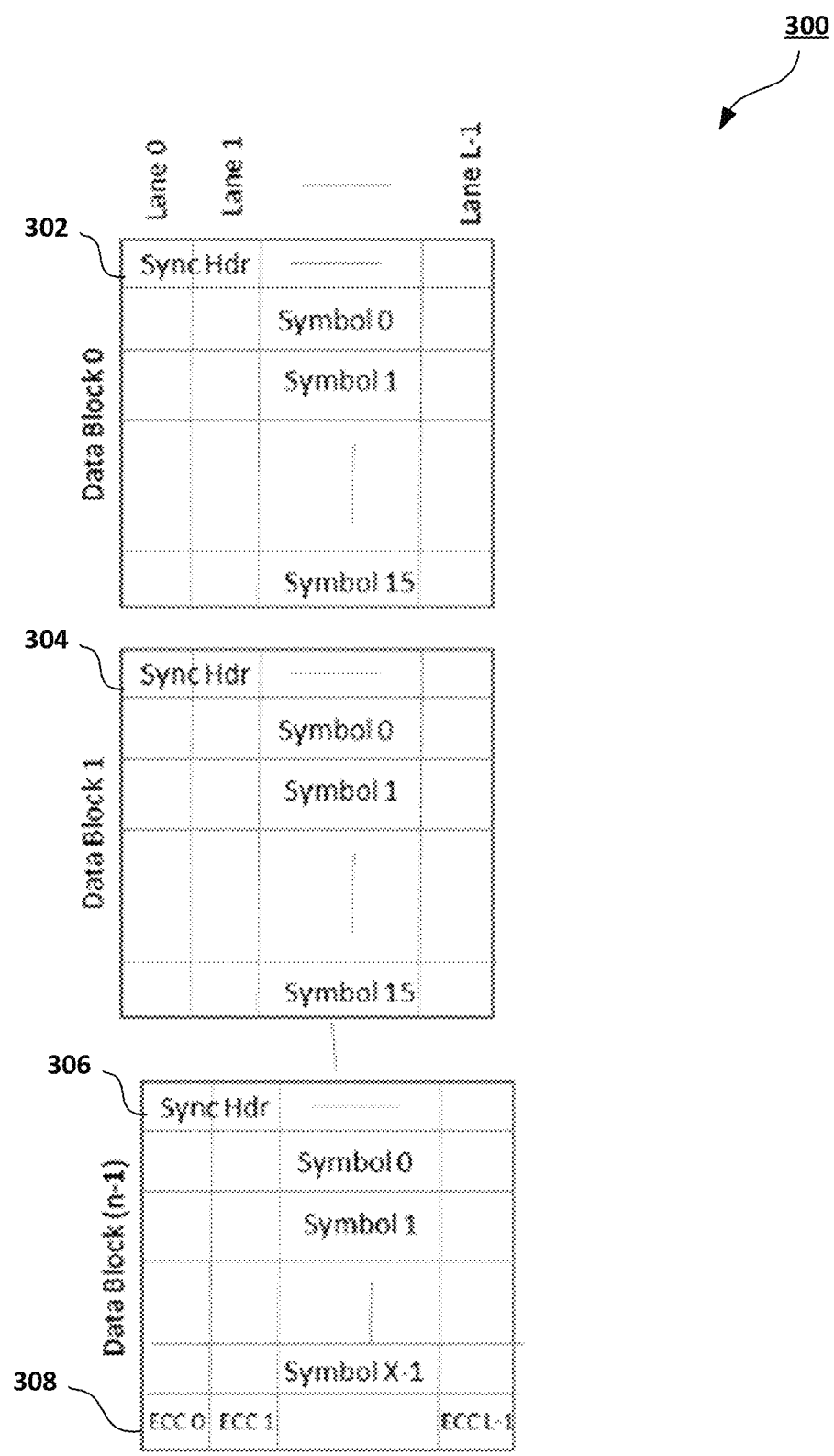
FIG. 3A-3B are schematic diagrams illustrating error correcting code (ECC) bits of forward error correction for data blocks in accordance with embodiments of the present disclosure.
Figure 3B:
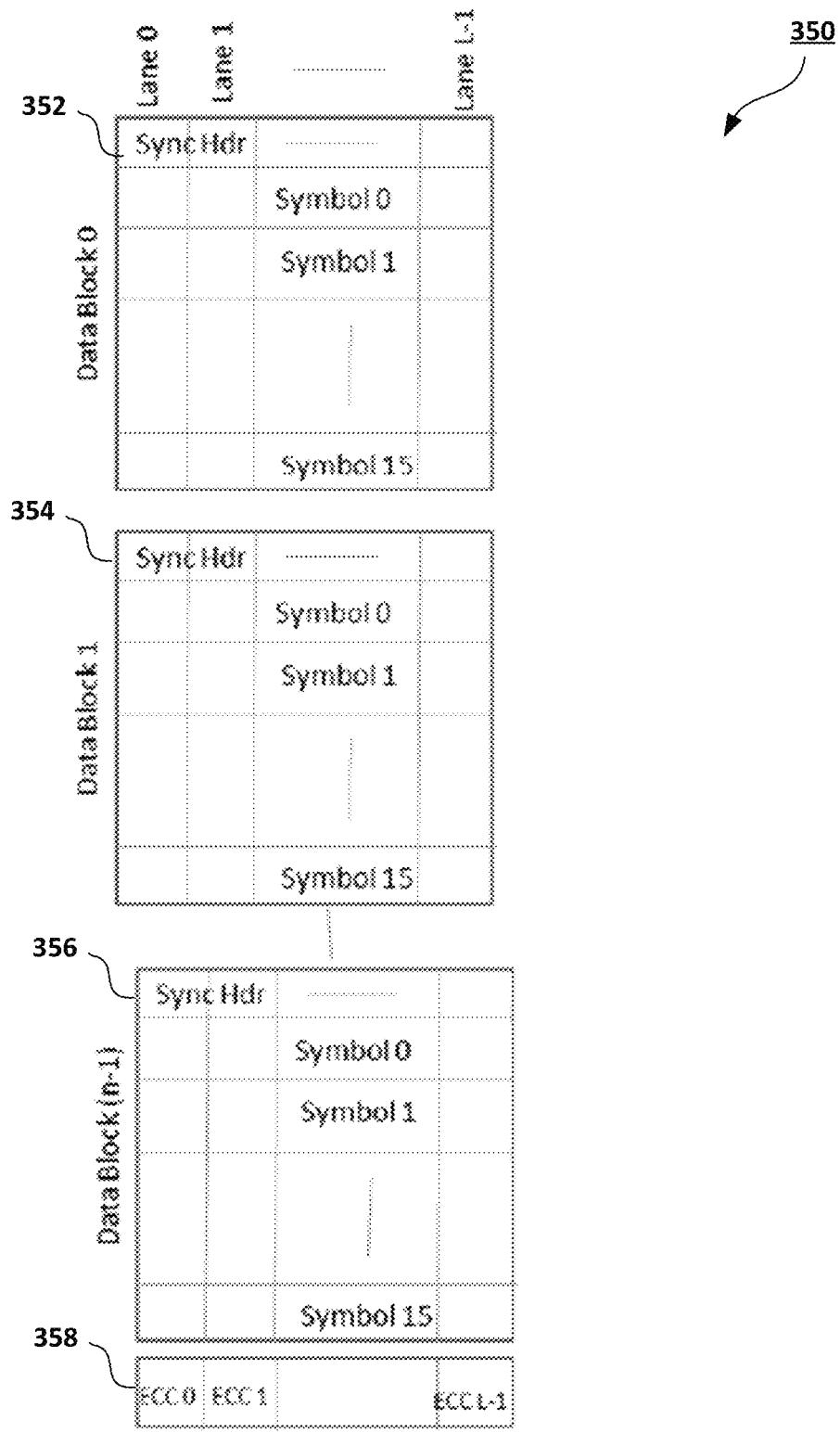

There are a number of ways for the ECC bits (of FEC) to be sent with the Data Blocks. FIG. 3A-3B are schematic diagrams illustrating error correcting code (ECC) bits of forward error correction for data blocks in accordance with embodiments of the present disclosure. Every n blocks of data in each lane can be covered by some ECC bits. For example, one can choose 32 bits of ECC to cover 4 Data Blocks (n=4), as long as the 32 bits can cover 520+32 bits as long as the lower target BER and error model can result in the traditional 1E-12 BER of PCIe after applying the FEC code. Two example and non-limiting ways of doing this:

In a first example, the ECC bits are part of the nth data Block, as shown in FIG. 3A. FIG. 3A is a schematic diagram 300 of data blocks in which error correction code bits are embedded within an nth data block in accordance with embodiments of the present disclosure. The diagram 300 shows three data blocks: data block 0 302, data block 1 304, and data block (n−1) 306. The error correcting code (ECC) 308 can be embedded into the data block (n−1) 306.

In a second example, the ECC bits form a separate set of symbols outside of the data block, as shown in FIG. 3B. FIG. 3B is a schematic diagram 350 of data blocks and error correction code bits transmitted after every nth data block in accordance with embodiments of the present disclosure. Data block 0 352, data block 1 354, and data block (n−1) 356 do not include embedded ECC bits. Instead, after data block (n−1) 356, the ECC bits 358 can be transmitted as separate symbols.

Ordered Sets such as skip (SKP) Ordered Set cannot be covered by FEC since the number of SKP symbols between the transit port and Receive port can change due to clock compensation adjustment. However, it is important that we have alternate protection mechanism for SKP Ordered Set since any errors there can cause possible data corruption issues. A SKP Ordered Set includes 4 to 20 SKPs followed by one SKP_END (or SKP_END_CTL) followed by 3 Symbols. The SKP Ordered Set should be modified (as shown in Table below) so the Port transmits 10 SKPs followed by 3 SKP_END (or SKP_END_CTL)s followed by the 3 Symbols. A Port can accept a SKP as long as it sees at least 2 SKP or SKP_END (or SKP_END_CTL) in the first four Symbols and accept the SKP_END (or SKP_END_CTL) as long as it sees at least one SKP_END (or SKP_END_CTL) in the last two Symbols of the prior 4-Symbol block or the first Symbol of a 4-Symbol block. Each Retimer removes the SKP Symbol from the start of the block so that at least 3 SKP_END (or SKP_END_CTL)s are scheduled to be delivered to the USP/DSP.

An EIOS Ordered Set sequence should be 3 consecutive EIOS so that at least one will be delivered even in the presence of errors.

An SDS Ordered Set can be modified to have the first 4 Symbols as E1h and the remaining 12 Symbols as 55h (as opposed to the first Symbol as E1h and the following 15 Symbols as 55h). An SDS Ordered Set must be accepted as long as at least one E1h is received in a 4-Symbol boundary and the rest of the Symbols in the block have at least 8 consecutive 55h Symbols.

The TS1/TS2 Ordered Sets need not be covered by any error protection scheme since they are sent periodically, with the sending 16 TS2 Ordered Set transmitted sets be increased to 24. One can potentially cover the TS1/TS2 Ordered Sets and SDS Ordered Set with an ECC (either scrambled or not), with a requirement that the SDS be placed on the nth Block. The FTS need not be ECC protected since it is used to train. One can send three EIEOS (instead of one) followed by SDS to deal with any error on the EIEOS, while using the SDS protection mechanism described above.

| Symbol Number | Value | Description |
|---|---|---|
| 0 through (4 * N − 3) [N can be 1 through 5] | AAh | SKP Symbol. Symbol 0 is the SKP Ordered Set identifier. |
| 4 * N − 2, 4 * N − 2, 4 * N | E1h or 78h | SKP_END or SKP_END_CTL Symbol (depending on Standard or Control SKP Ordered Set) Signifies the end of the SKP Ordered Set after three more Symbols. |
| 4 * N + 1, 4 * N + 2, 4 * N + 3 | 00-FFh | Misc stuff such as Err_cnt, LFSR, or Margin Related Command/Status depending on the type of SKP Ordered Set and LTSSM state |

Figure 4:
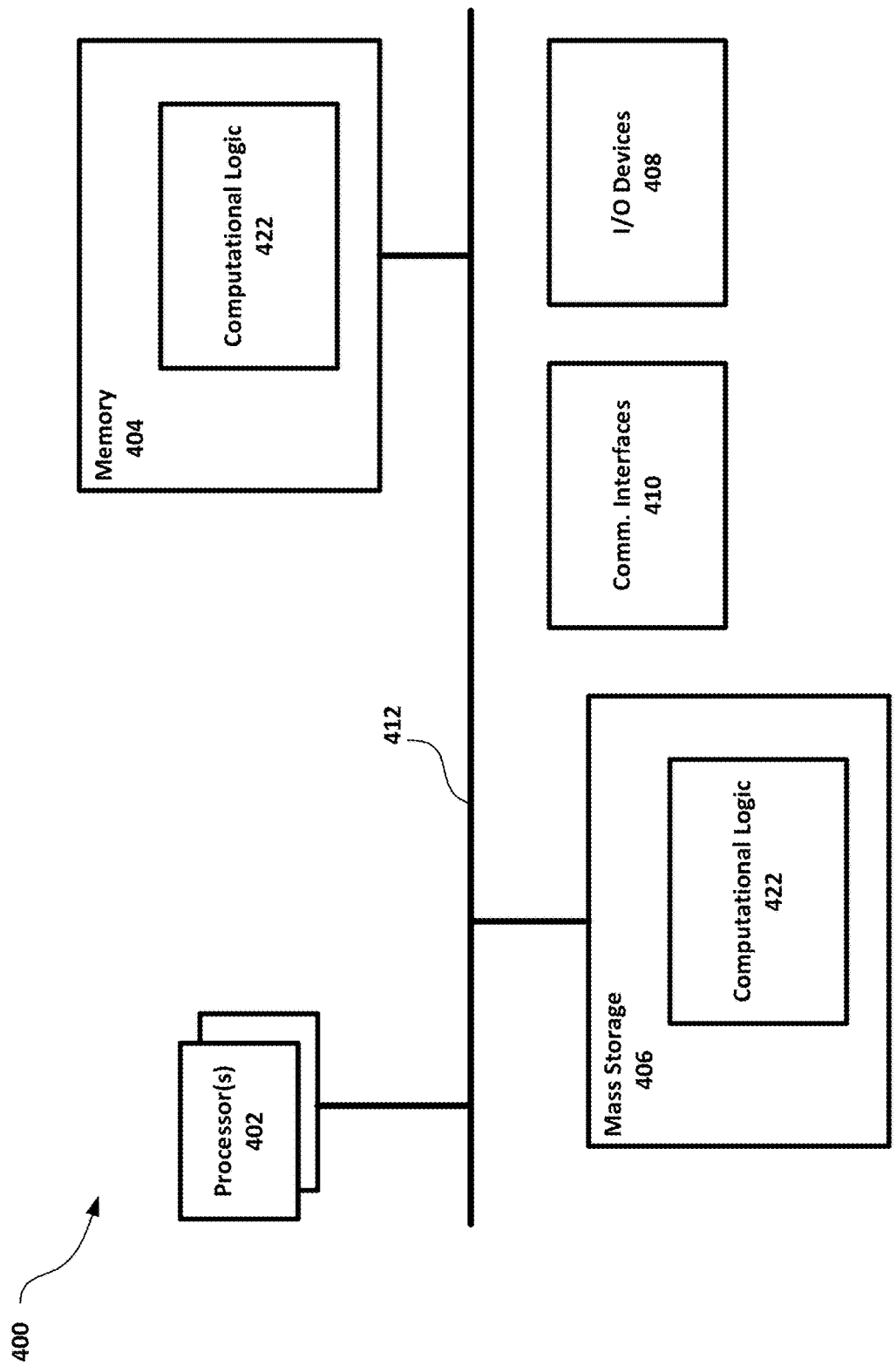
FIG. 4 is a schematic diagram of an example computing device 400 that may include and/or be suitable for use with various components described herein

FIG. 4 is a schematic diagram of an example computing device 400 that may include and/or be suitable for use with various components described herein. As shown, computing device 400 may include one or more processors or processor cores 402 and system memory 404. For the purpose of this application, including the claims, the terms "processor" and "processor cores" may be considered synonymous, unless the context clearly requires otherwise. The processor 402 may include any type of processors, such as a central processing unit (CPU), a microprocessor, and the like. The processor 402 may be implemented as an integrated circuit having multi-cores, e.g., a multi-core microprocessor. The computing device 400 may include mass storage devices 406 (such as diskette, hard drive, volatile memory (e.g., dynamic random-access memory (DRAM), compact disc read-only memory (CD-ROM), digital versatile disk (DVD), and so forth). In general, system memory 404 and/or mass storage devices 406 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth. The processor(s) 402, mass storage 406 and/or system memory 404 may together or separately be considered to be, or implement, the BIOS and/or EC in whole or in part.

The computing device 400 may further include I/O devices 408 (such as a display (e.g., a touchscreen display), keyboard, cursor control, remote control, gaming controller, image capture device, and so forth) and communication interfaces 410 (such as network interface cards, modems, infrared receivers, radio receivers (e.g., Bluetooth), and so forth). In some embodiments the I/O devices 408 may be coupled with the other components of the computing device 400 via a PCIe $4^{th}$ Gen and/or $5^{th}$ Gen connection as described herein.

The communication interfaces 410 may include communication chips (not shown) that may be configured to operate the device 400 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 410 may operate in accordance with other wireless protocols in other embodiments. In some embodiments, the communication interfaces 410 may be, may include, and/or may be coupled with the EC and/or TCPM as described herein.

The above-described computing device 400 elements may be coupled to each other via system bus 412, which may represent one or more buses. In the case of multiple buses, they may be bridged by one or more bus bridges (not shown). Each of these elements may perform its conventional functions known in the art. In particular, system memory 404 and mass storage devices 406 may be employed to store a working copy and a permanent copy of the programming instructions for the operation of various components of computing device 400, including but not limited to an operating system of computing device 400 and/or one or more applications. The various elements may be implemented by assembler instructions supported by processor(s) 402 or high-level languages that may be compiled into such instructions.

The permanent copy of the programming instructions may be placed into mass storage devices 406 in the factory, or in the field through, for example, a distribution medium (not shown), such as a compact disc (CD), or through communication interface 410 (from a distribution server (not shown)). That is, one or more distribution media having an implementation of the agent program may be employed to distribute the agent and to program various computing devices.

The number, capability, and/or capacity of the elements 408, 410, 412 may vary, depending on whether computing device 400 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 404 may include computational logic 422 configured to implement various firmware and/or software services associated with operations of the computing device 400. For some embodiments, at least one of processors 402 may be packaged together with computational logic 422 configured to practice aspects of embodiments described herein to form a System in Package (SiP) or a System on Chip (SoC).

In various implementations, the computing device 400 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 400 may be any other electronic device that processes data. In some embodiments certain elements such as the BIOS, USB-C, EC, and/or TCPM are described as related to specific elements of FIG. 4, while in other embodiments one or more of the various elements may be related to different elements of FIG. 4.

Figure 5:
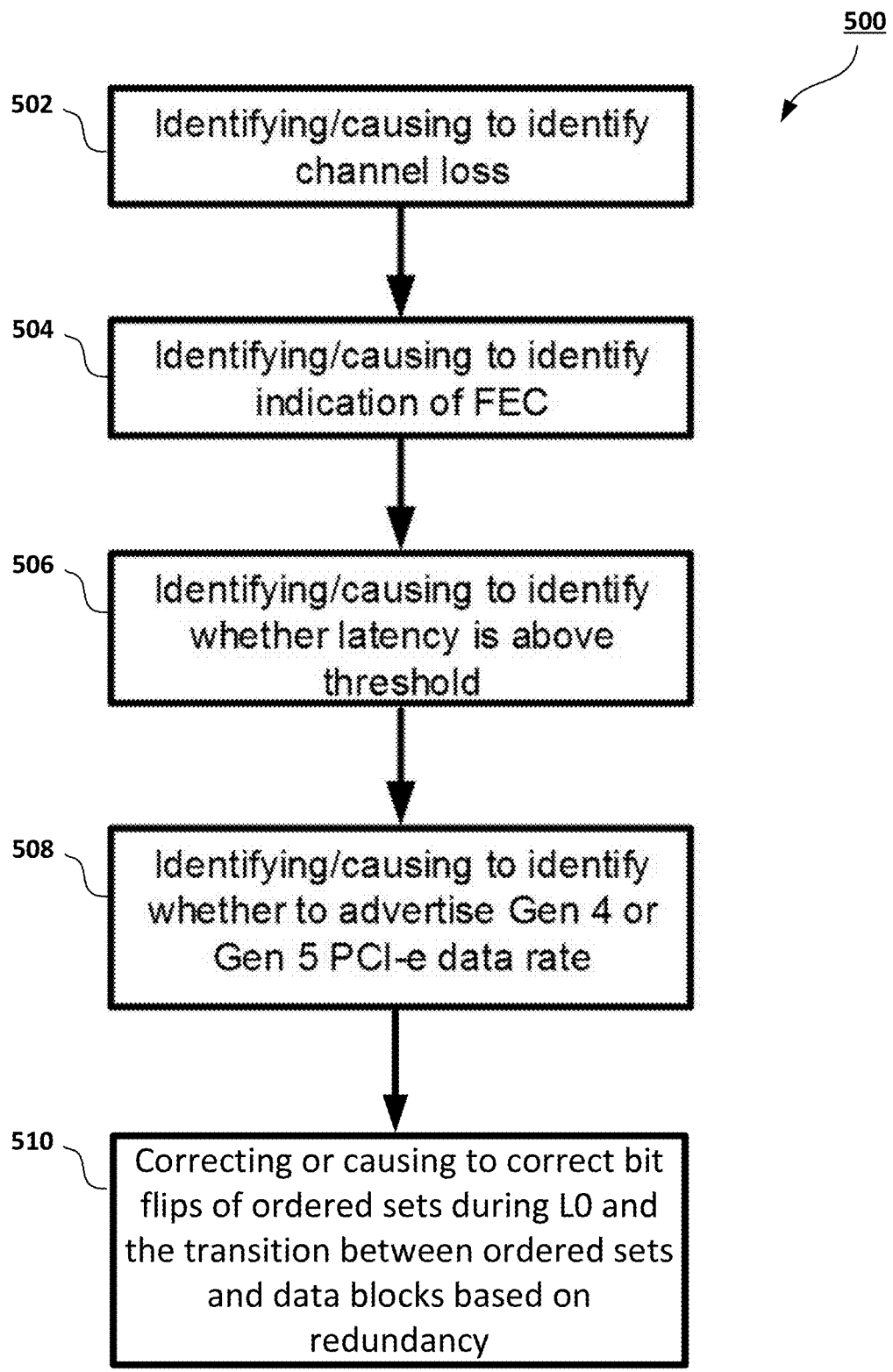
FIG. 5 is a process flow diagram for forward error correction in accordance with embodiments of the present disclosure.

In some embodiments, the electronic device of FIG. 4 (or portions or implementations thereof) may be configured to perform one or more processes, techniques, and/or methods as described herein, or portions thereof. One such process is depicted in FIG. 5. For example, the process may include identifying or causing to identify, by a port, an indication of a channel loss of a channel; identifying or causing to identify, by the port, an indication of whether a receiver associated with the port desires forward error correction (FEC) for the channel; identifying or causing to identify, by the port based on the indication of the channel loss and the indication of whether the receiver desires FEC, whether latency associated with the FEC is above an acceptability threshold; and identifying or causing to identify, by the port based on whether the latency is above the acceptability threshold, whether to advertise a Gen 4 or Gen 5 peripheral component interconnect-express (PCI-e) data rate.

FIG. 5 is a process flow diagram 500 for forward error correction in accordance with embodiments of the present disclosure. A controller or one or more ports of a PCIe compliant system or device can perform one or more of the process steps described herein. At the outset, port can identify or cause to identify an indication of a channel loss of a channel (502). The port can identify or cause to be identified, by the port, an indication of whether a receiver associated with the port desires forward error correction (FEC) for the channel (504). The port can identify or cause to be identified, based on the indication of the channel loss and the indication of whether the receiver desires FEC, whether latency associated with the FEC is above an acceptability threshold (506). The port can identify or cause to be identified, by the port based on whether the latency is above the acceptability threshold, whether to advertise a Gen 4 or Gen 5 peripheral component interconnect-express (PCI-e) data rate (508). The port can correct or cause to correct bit flips of ordered sets during L0 and the transition between ordered sets and data blocks based on redundancy (510).

In some aspects of the embodiments, the port can determine that the channel latency is related to a distance between two components within the channel. The channel latency can be used by the port or by a controller to determine a channel loss or potential channel loss for the channel or for one or more links that form the channel. In some embodiments, one or more of the components can be a retimer.

The indication of the channel loss can be a bit that indicates whether the channel loss is less than 30 decibels (dB) or between 30 and 35 dB.

The FEC ECC can be embedded into every nth data block or can be sent with the data blocks, after every nth data blocks, as separate symbols. Put differently, the EEC can be send at predetermined intervals, and either embedded with data blocks or as separate symbols.

Figure 6:
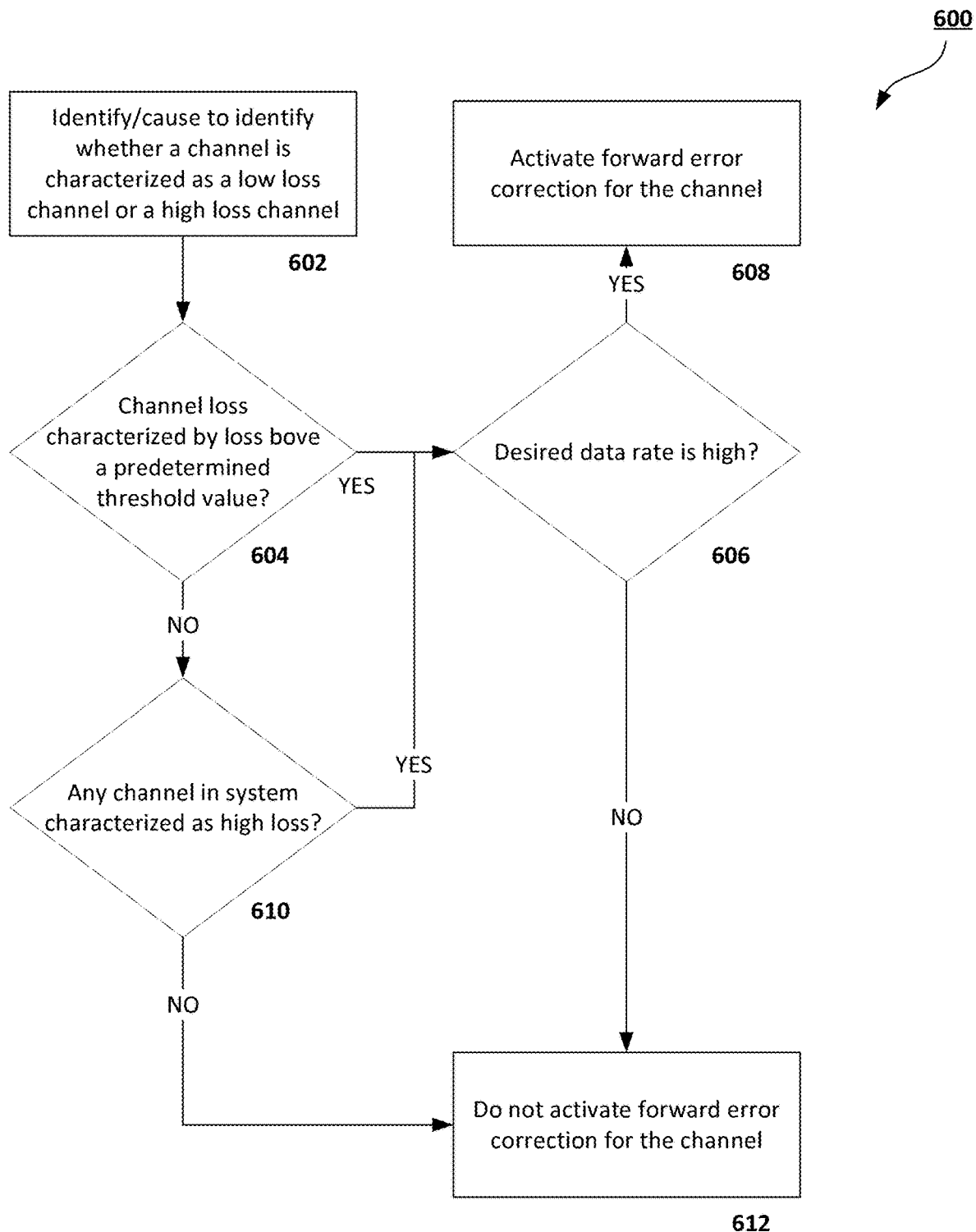
FIG. 6 is a process flow diagram for determining when to use forward error correction in accordance with embodiments of the present disclosure.

FIG. 6 is a process flow diagram 600 for determining when to use forward error correction in accordance with embodiments of the present disclosure. A port or a controller can identify or cause to identify whether a channel is characterized as a low loss channel or a high loss channel (602). The port or controller can determine whether the channel is a high loss channel or a low loss channel based on whether the channel loss is above or below a predetermined threshold value (604).

If the port or the controller determines that the channel is a high loss channel (e.g., high loss can be characterized by a channel having a channel loss above 30 dB), then the port or controller can activate forward error correction (FEC) for that channel (608). In embodiments, the port or controller can make a second determination prior to activating FEC for the channel: the port or controller can determine whether the channel or component wants, needs, or is configured to operate at high data rates (e.g., data rates commensurate with Gen 5 PCIe or higher) (606). If the port or controller determines that the channel is characterized as a high loss channel and the port or controller determines that the component is to run at a high data rate, then the port or controller can activate FEC (606). If the port or controller determines that the channel is characterized as a high loss channel but the data rate for that channel does not need to be a high data rate, then FEC can remain inactive (612).

If the port or controller determines that the channel is not lossy (e.g., channel loss below 30 dB), then the port or controller does not activate FEC (612). In embodiments, the port or controller can make a second determination: the port or controller can determine whether another channel or link is a high loss channel (e.g., high loss corresponding to a channel loss above 30 dB) (610). For example, in a situation where there is one or more retimers between an upstream component and a downstream component, each segment of the link can be evaluated for channel loss. If any segment of the channel is considered to be high loss, then the port or controller can activate FEC (608). In embodiments, the port or controller can also determine whether the link and/or component is high loss and is to operate at high data rates (606), and if so, can then activate FEC (608). If the link is lossy but no high data rate is needed, then the port or controller does not activate FEC (612).

If no channel or link on the channel is characterized as a high loss channel, then FEC is not activated (612).

Table 1 summarizes various scenarios during which FEC can be activated.

TABLE 1

Scenarios for Activating FEC.

| Channel lossy | Receiver handles Lossy Channel? | Any link lossy and its Receiver does not handle lossy channel | High data rate? | Action |
| --- | --- | --- | --- | --- |
| Yes | No | n/a | Yes | Activate FEC |
| Yes | Yes | n/a | Yes | Do not active FEC |
| No | n/a | Yes | Yes | Activate FEC |
| Yes | n/a | n/a | No | Do not activate FEC |
| No | n/a | Yes | No | Do not activate FEC |
| No | n/a | No | n/a | Do not activate FEC |

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 7:
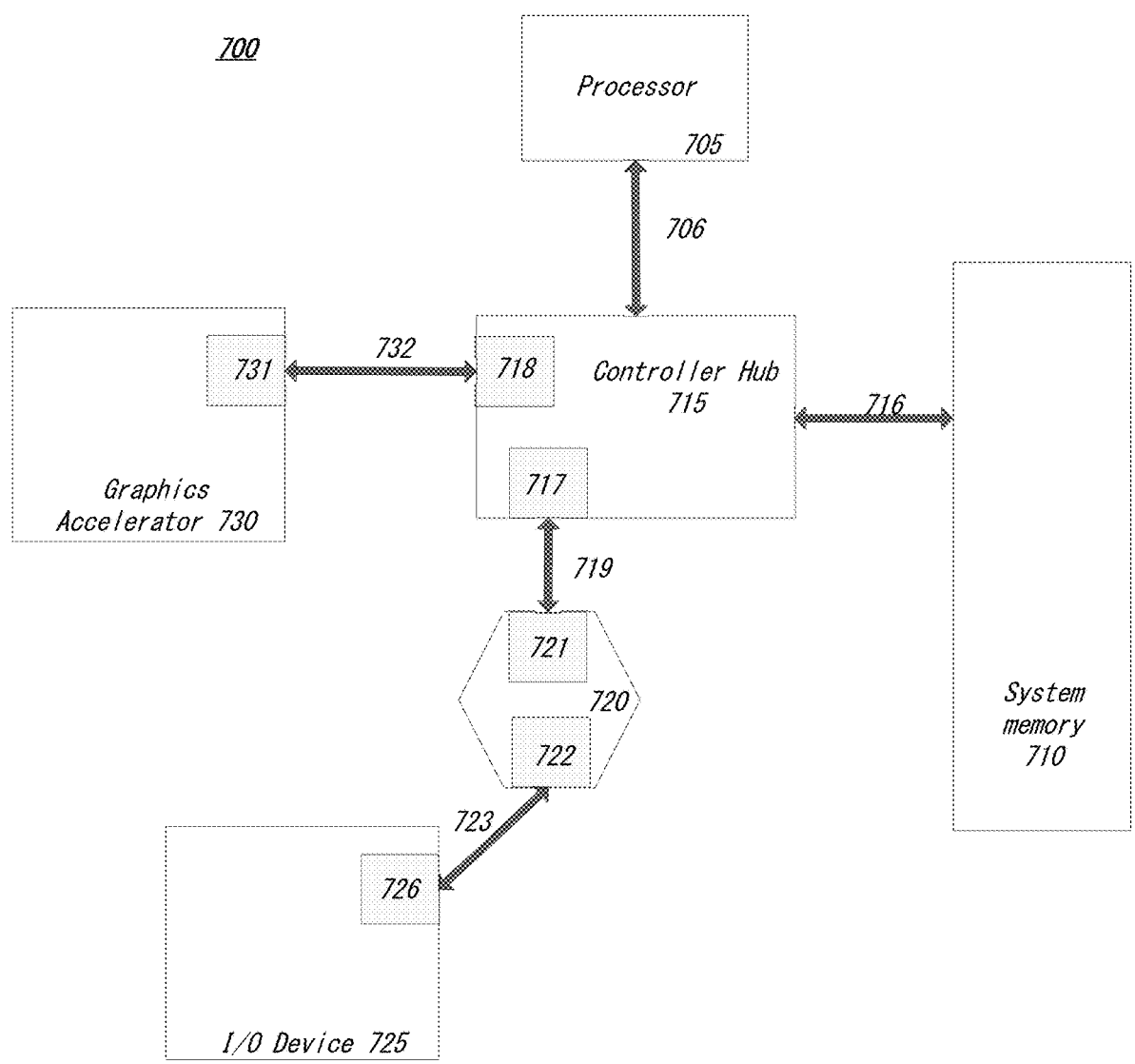
FIG. 7 is a schematic diagram of an embodiment of a fabric composed of point-to-point links that interconnect a set of components in accordance with embodiments of the present disclosure.

Referring to FIG. 7, an embodiment of a fabric composed of point-to-point Links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

Figure 8:
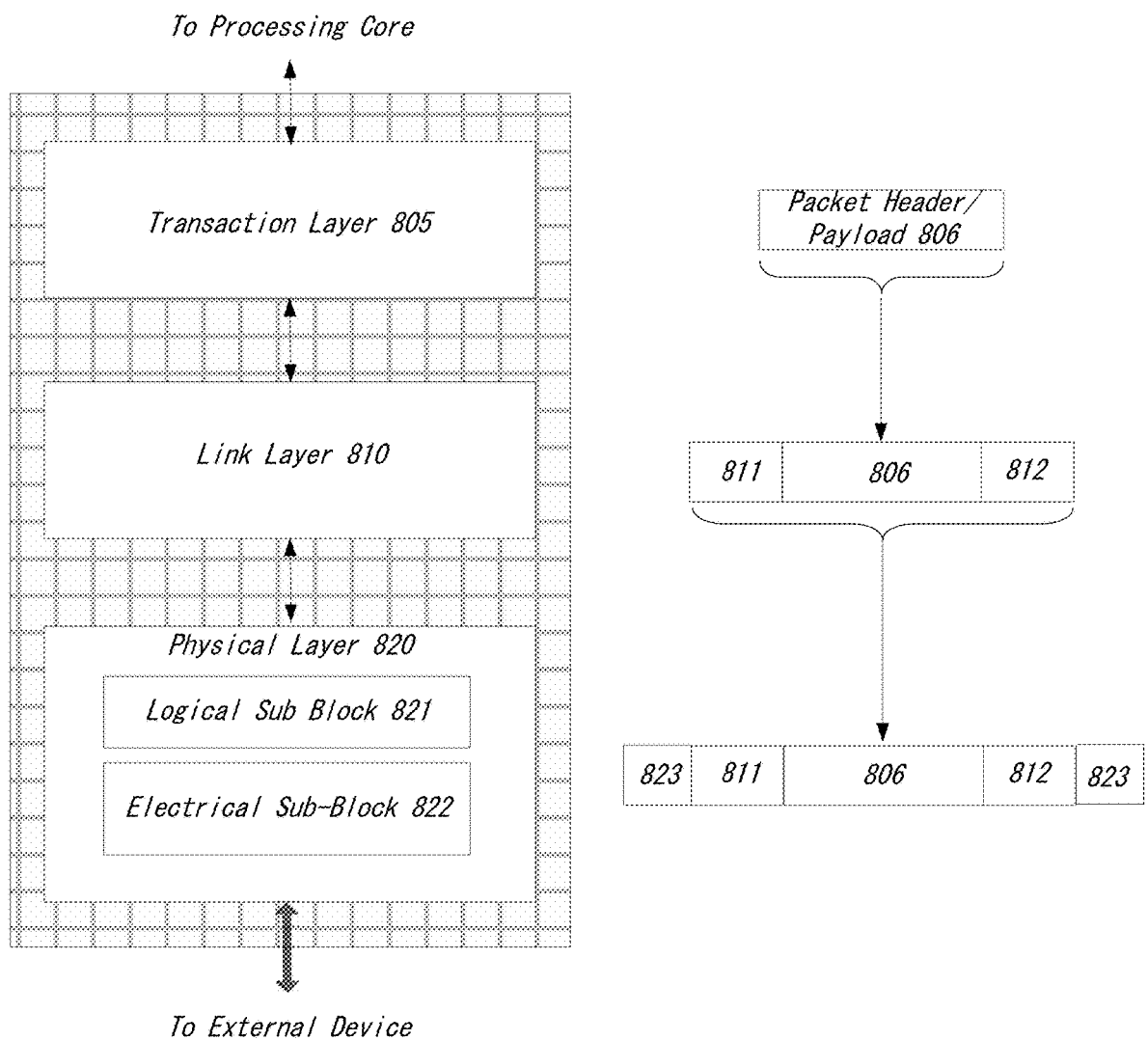
FIG. 8 is a schematic diagram of an embodiment of a layered protocol stack in accordance with embodiments of the present disclosure.

Turning to FIG. 8, an embodiment of a layered protocol stack is illustrated. Layered protocol stack 800 includes any form of a layered communication stack, such as a Quick Path Interconnect (QPI) stack, a PCie stack, a next generation high performance computing interconnect stack, or other layered stack. Although the discussion immediately below in reference to FIGS. 7-10 are in relation to a PCIe stack, the same concepts may be applied to other interconnect stacks. In one embodiment, protocol stack 800 is a PCIe protocol stack including transaction layer 805, link layer 810, and physical layer 820. An interface, such as interfaces 717, 718, 721, 722, 726, and 731 in FIG. 7, may be represented as communication protocol stack 800. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that can be processed by the Transaction Layer 805 of the receiving device.

Transaction Layer

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (i.e., transaction layer packets, or TLPs). The translation layer 805 typcially manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 805. An external device at the opposite end of the link, such as controller hub 715 in FIG. 7, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Figure 9:
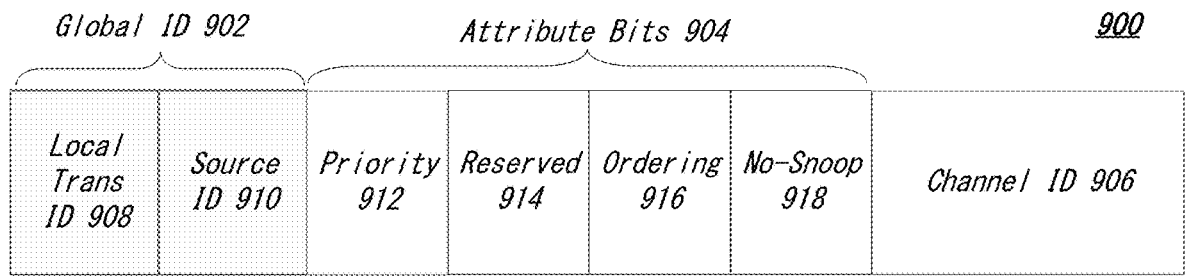
FIG. 9 is a schematic diagram of an embodiment of a PCIe transaction descriptor in accordance with embodiments of the present disclosure.

Quickly referring to FIG. 9, an embodiment of a PCIe transaction descriptor is illustrated. In one embodiment, transaction descriptor 900 is a mechanism for carrying transaction information. In this regard, transaction descriptor 900 supports identification of transactions in a system. Other potential uses include tracking modifications of default transaction ordering and association of transaction with channels.

Transaction descriptor 900 includes global identifier field 902, attributes field 904 and channel identifier field 906. In the illustrated example, global identifier field 902 is depicted comprising local transaction identifier field 908 and source identifier field 910. In one embodiment, global transaction identifier 902 is unique for all outstanding requests.

According to one implementation, local transaction identifier field 908 is a field generated by a requesting agent, and it is unique for all outstanding requests that require a completion for that requesting agent. Furthermore, in this example, source identifier 910 uniquely identifies the requestor agent within a PCIe hierarchy. Accordingly, together with source ID 910, local transaction identifier 908 field provides global identification of a transaction within a hierarchy domain.

Attributes field 904 specifies characteristics and relationships of the transaction. In this regard, attributes field 904 is potentially used to provide additional information that allows modification of the default handling of transactions. In one embodiment, attributes field 904 includes priority field 912, reserved field 914, ordering field 916, and no-snoop field 918. Here, priority sub-field 912 may be modified by an initiator to assign a priority to the transaction. Reserved attribute field 914 is left reserved for future, or vendor-defined usage. Possible usage models using priority or security attributes may be implemented using the reserved attribute field.

In this example, ordering attribute field 916 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 918 is utilized to determine if transactions are snooped. As shown, channel ID Field 906 identifies a channel that a transaction is associated with.

Link Layer

Now returning to FIG. 8, link layer 810, also referred to as data link layer 810, acts as an intermediate stage between transaction layer 805 and the physical layer 820. In one embodiment, a responsibility of the data link layer 810 is providing a reliable mechanism for exchanging Transaction Layer Packets (TLPs) between two components a link. One side of the Data Link Layer 810 accepts TLPs assembled by the Transaction Layer 805, applies packet sequence identifier 811, i.e. an identification number or packet number, calculates and applies an error detection code, i.e. CRC 812, and submits the modified TLPs to the Physical Layer 820 for transmission across a physical to an external device.

Physical Layer

In one embodiment, physical layer 820 includes logical sub block 821 and electrical sub-block 822 to physically transmit a packet to an external device. Here, logical sub-block 821 is responsible for the "digital" functions of Physical Layer 821. In this regard, the logical sub-block includes a transmit section to prepare outgoing information for transmission by physical sub-block 822, and a receiver section to identify and prepare received information before passing it to the Link Layer 810.

Physical block 822 includes a transmitter and a receiver. The transmitter is supplied by logical sub-block 821 with symbols, which the transmitter serializes and transmits onto to an external device. The receiver is supplied with serialized symbols from an external device and transforms the received signals into a bit-stream. The bit-stream is de-serialized and supplied to logical sub-block 821. In one embodiment, an 8b/10b transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 10:
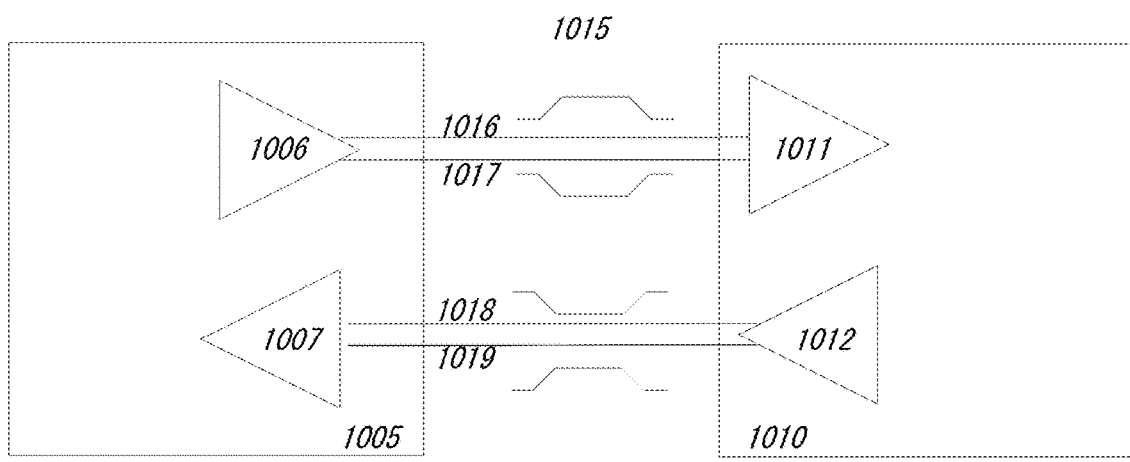
FIG. 10 is a schematic diagram of an embodiment of a PCIe serial point to point fabric in accordance with embodiments of the present disclosure.

Referring next to FIG. 10, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device 1010. In other words, two transmitting paths, i.e. paths 1016 and 1017, and two receiving paths, i.e. paths 1018 and 1019, are included in a PCIe link.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 11:
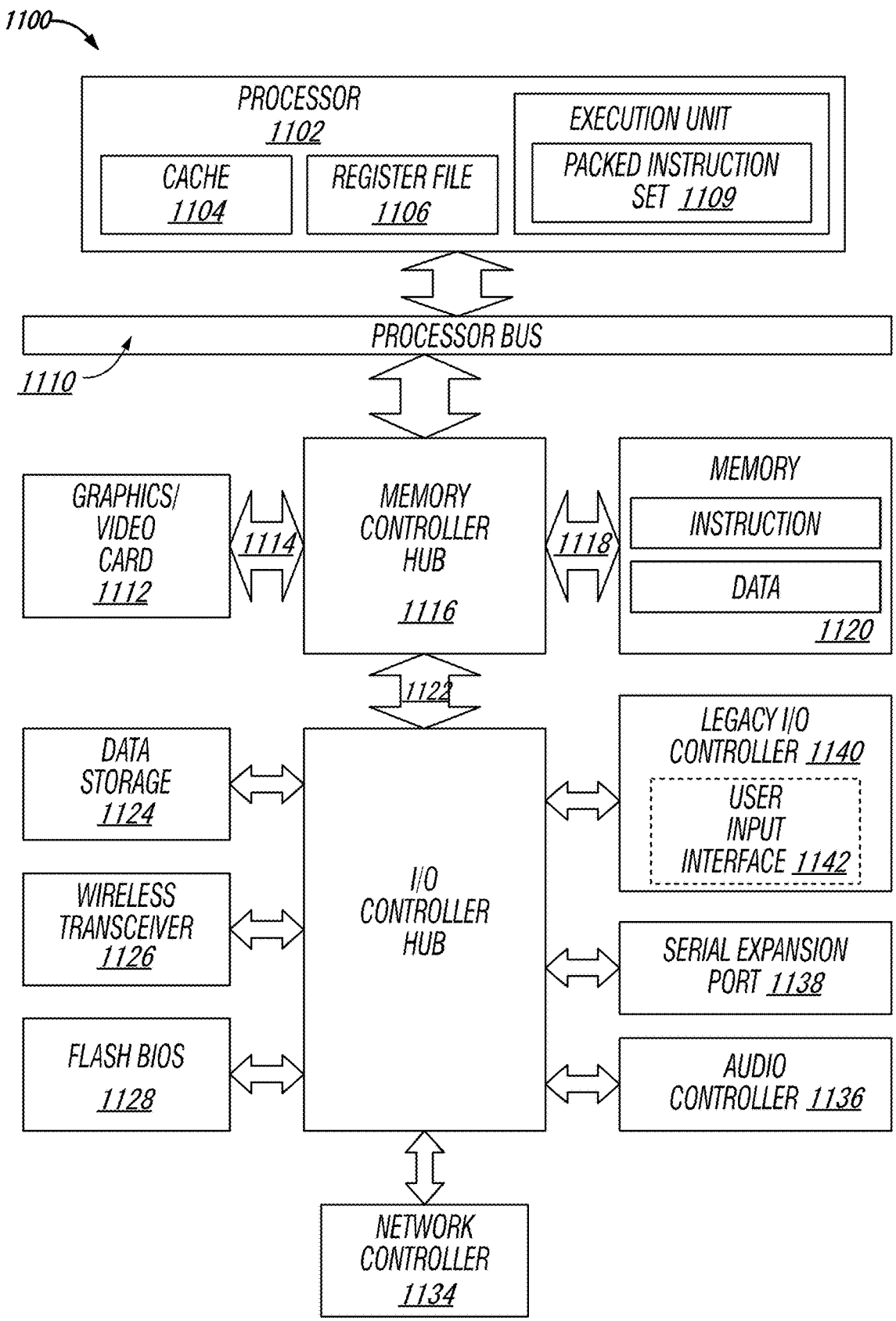
FIG. 11 is a schematic block diagram of an exemplary computer system formed with a processor that includes execution units to execute an instruction, where one or more of the interconnects implement one or more features in accordance with one embodiment of the present disclosure.

Turning to FIG. 11, a block diagram of an exemplary computer system formed with a processor that includes execution units to execute an instruction, where one or more of the interconnects implement one or more features in accordance with one embodiment of the present disclosure is illustrated. System 1100 includes a component, such as a processor 1102 to employ execution units including logic to perform algorithms for process data, in accordance with the present disclosure, such as in the embodiment described herein. System 1100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1102 includes one or more execution units 1108 to implement an algorithm that is to perform at least one instruction. One embodiment may be described in the context of a single processor desktop or server system, but alternative embodiments may be included in a multiprocessor system. System 1100 is an example of a 'hub' system architecture. The computer system 1100 includes a processor 1102 to process data signals. The processor 1102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1102 is coupled to a processor bus 1110 that transmits data signals between the processor 1102 and other components in the system 1100. The elements of system 1100 (e.g. graphics accelerator 1112, memory controller hub 1116, memory 1120, I/O controller hub 1124, wireless transceiver 1126, Flash BIOS 1128, Network controller 1134, Audio controller 1136, Serial expansion port 1138, I/O controller 1140, etc.) perform their conventional functions that are well known to those familiar with the art.

In one embodiment, the processor 1102 includes a Level 1 (L1) internal cache memory 1104. Depending on the architecture, the processor 1102 may have a single internal cache or multiple levels of internal caches. Other embodiments include a combination of both internal and external caches depending on the particular implementation and needs. Register file 1106 is to store different types of data in various registers including integer registers, floating point registers, vector registers, banked registers, shadow registers, checkpoint registers, status registers, and instruction pointer register.

Execution unit 1108, including logic to perform integer and floating point operations, also resides in the processor 1102. The processor 1102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1102. For one embodiment, execution unit 1108 includes logic to handle a packed instruction set 1109. By including the packed instruction set 1109 in the instruction set of a general-purpose processor 1102, along with associated circuitry to execute the instructions, the operations used by many multimedia applications may be performed using packed data in a general-purpose processor 1102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1108 may also be used in micro controllers, embedded processors, graphics devices, DSPs, and other types of logic circuits. System 1100 includes a memory 1120. Memory 1120 includes a dynamic random access memory (DRAM) device, a static random access memory (SRAM) device, flash memory device, or other memory device. Memory 1120 stores instructions and/or data represented by data signals that are to be executed by the processor 1102.

Note that any of the aforementioned features or aspects of the disclosure may be utilized on one or more interconnect illustrated in FIG. 11. For example, an on-die interconnect (ODI), which is not shown, for coupling internal units of processor 1102 implements one or more aspects of the disclosure described above. Or the disclosure is associated with a processor bus 1110 (e.g. Intel Quick Path Interconnect (QPI) or other known high performance computing interconnect), a high bandwidth memory path 1118 to memory 1120, a point-to-point link to graphics accelerator 1112 (e.g. a Peripheral Component Interconnect express (PCIe) compliant fabric), a controller hub interconnect 1122, an I/O or other interconnect (e.g. USB, PCI, PCIe) for coupling the other illustrated components. Some examples of such components include the audio controller 1136, firmware hub (flash BIOS) 1128, wireless transceiver 1126, data storage 1124, legacy I/O controller 1110 containing user input and keyboard interfaces 1142, a serial expansion port 1138 such as Universal Serial Bus (USB), and a network controller 1134. The data storage device 1124 can comprise a hard disk drive, a floppy disk drive, a CD-ROM device, a flash memory device, or other mass storage device.

Figure 12:
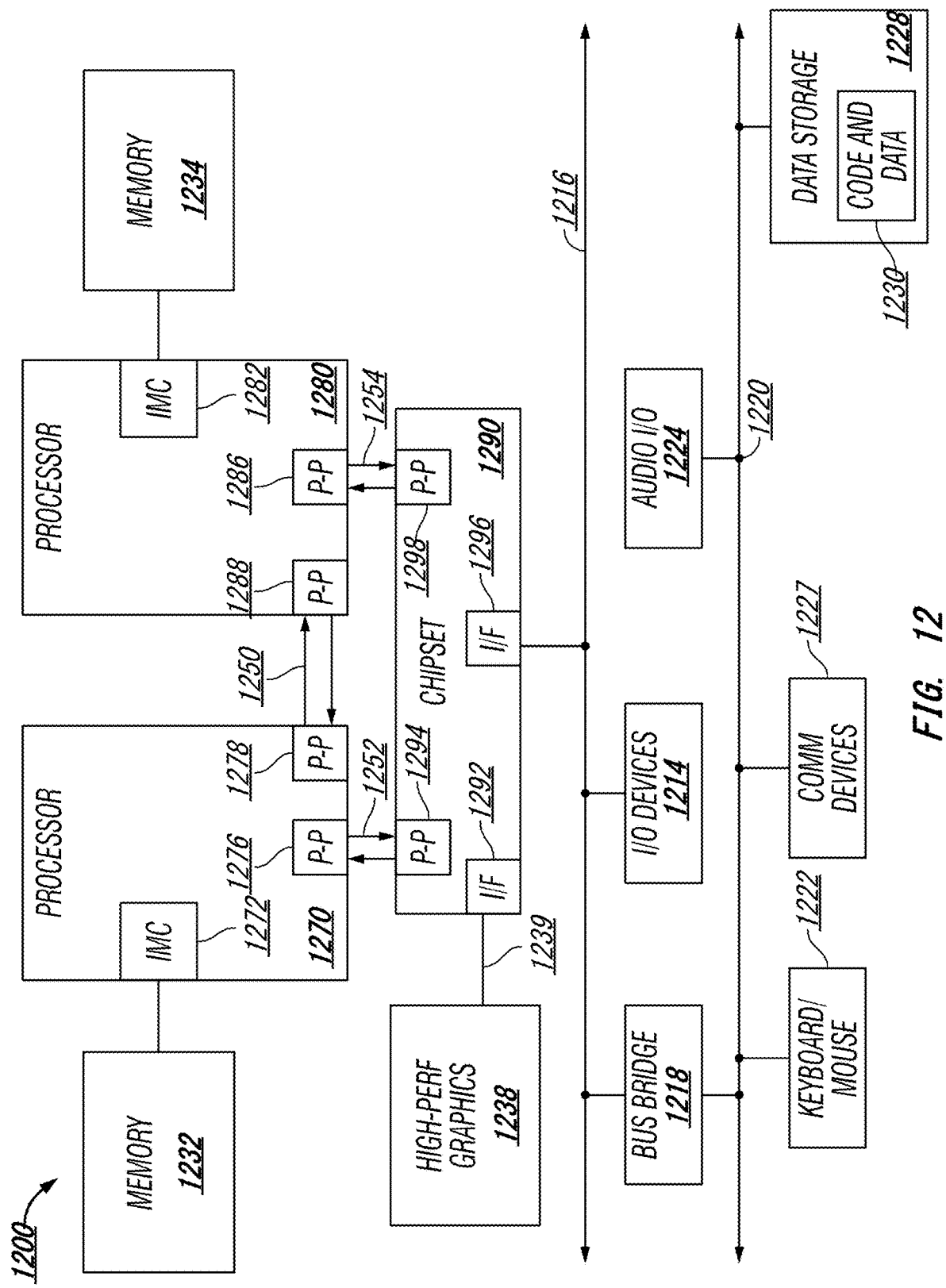
FIG. 12 is a schematic block diagram of a system in accordance with an embodiment of the present disclosure.

Referring now to FIG. 12, shown is a block diagram of a second system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, the disclosure may be implemented within the QPI architecture.

While shown with only two processors 1270, 1280, it is to be understood that the scope of the present disclosure is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

Example 1 may include an apparatus comprising means to identify, by a port, an indication of a channel loss of a channel; means to identify, by the port, an indication of whether a receiver associated with the port desires forward error correction (FEC) for the channel; means to identify, by the port based on the indication of the channel loss and the indication of whether the receiver desires FEC, whether latency associated with the FEC is above an acceptability threshold; and means to identify, by the port based on whether the latency is above the acceptability threshold, whether to advertise a Gen 4 or Gen 5 peripheral component interconnect-express (PCI-e) data rate.

Example 2 may include the apparatus of example 1 and/or some other example herein, whether the channel latency is related to a distance between two components within the channel.

Example 3 may include the apparatus of example 2 and/or some other example herein, wherein one of the components of the two components is a retimer. A retimer is also a component—the two ends of a link are called the upstream port (or downstream component) and downstream rort (or upstream component). So FIG. 2 would have 4 components in the link comprising of 3 "Sub-Links" (sub-links 210a between upstream component 202 and retimer1 204, sub-links 210b between retimer1 204 and retimer 2 206, and sublinks 210c between retimer2 206 and downstream component 208).

Example 4 may include the apparatus of example 1 and/or some other example herein, wherein the indication of the channel loss is a bit that indicates whether the channel loss is less than 30 decibels (dB) or between 30 and 35 dB.

Example 5 may include the apparatus of example 1 and/or some other example herein, wherein FEC is related to data blocks at predetermined intervals.

Example 6 may include the apparatus of example 1 and/or some other example herein, further comprising means to correct, by the port, bit flips of ordered sets during L0 and the transition between ordered sets and data blocks based on redundancy.

Example 7 may include a method that includes identifying or causing to identify, by a port, an indication of a channel loss of a channel; identifying or causing to identify, by the port, an indication of whether a receiver associated with the port desires forward error correction (FEC) for the channel; identifying or causing to identify, by the port based on the indication of the channel loss and the indication of whether the receiver desires FEC, whether latency associated with the FEC is above an acceptability threshold; and identifying or causing to identify, by the port based on whether the latency is above the acceptability threshold, whether to advertise a Gen 4 or Gen 5 peripheral component interconnect-express (PCI-e) data rate.

Example 8 may include the method of example 7 and/or some other example herein, whether the channel latency is related to a distance between two components within the channel.

Example 9 may include the method of example 8 and/or some other example herein, wherein one of the components of the two components is a retimer.

Example 10 may include the method of example 7 and/or some other example herein, wherein the indication of the channel loss is a bit that indicates whether the channel loss is less than 30 decibels (dB) or between 30 and 35 dB.

Example 11 may include the method of example 7 and/or some other example herein, wherein FEC is related to data blocks at predetermined intervals.

Example 12 may include the method of example 7 and/or some other example herein, further comprising correcting or causing to correct, by the port, bit flips of ordered sets during L0 and the transition between ordered sets and data blocks based on redundancy.

Example 13 may include one or more non-transitory computer-readable media comprising instructions to cause an apparatus, upon execution of the instructions by one or more processors of the apparatus, to identify, by a port, an indication of a channel loss of a channel; identify, by the port, an indication of whether a receiver associated with the port desires forward error correction (FEC) for the channel; identify, by the port based on the indication of the channel loss and the indication of whether the receiver desires FEC, whether latency associated with the FEC is above an acceptability threshold; and identify, by the port based on whether the latency is above the acceptability threshold, whether to advertise a Gen 4 or Gen 5 peripheral component interconnect-express (PCI-e) data rate.

Example 14 may include the one or more non-transitory computer-readable media of example 13 and/or some other example herein, whether the channel latency is related to a distance between two components within the channel.

Example 15 may include the one or more non-transitory computer-readable media of example 14 and/or some other example herein, wherein one of the components of the two components is a retimer.

Example 16 may include the one or more non-transitory computer-readable media of example 13 and/or some other example herein, wherein the indication of the channel loss is a bit that indicates whether the channel loss is less than 30 decibels (dB) or between 30 and 35 dB.

Example 17 may include the one or more non-transitory computer-readable media of example 13 and/or some other example herein, wherein FEC is related to data blocks at predetermined intervals.

Example 18 may include the one or more non-transitory computer-readable media of example 13 and/or some other example herein, wherein the instructions are further to correct, by the port, bit flips of ordered sets during L0 and the transition between ordered sets and data blocks based on redundancy.

Example 19 may include an apparatus that includes a channel that includes a plurality of components; and a port associated with the channel, the port to identify an indication of a channel loss of the channel; identify an indication of whether a receiver associated with the port desires forward error correction (FEC) for the channel; identify, based on the indication of the channel loss and the indication of whether the receiver desires FEC, whether latency associated with the FEC is above an acceptability threshold; and identify, based on whether the latency is above the acceptability threshold, whether to advertise a Gen 4 or Gen 5 peripheral component interconnect-express (PCI-e) data rate.

Example 20 may include the apparatus of example 19 and/or some other example herein, whether the channel latency is related to a distance between two components within the plurality of components.

Example 21 may include the apparatus of example 20 and/or some other example herein, wherein one of the components of the two components is a retimer.

Example 22 may include the apparatus of example 19 and/or some other example herein, wherein the indication of the channel loss is a bit that indicates whether the channel loss is less than 30 decibels (dB) or between 30 and 35 dB.

Example 23 may include the apparatus of example 19 and/or some other example herein, wherein FEC is related to data blocks at predetermined intervals.

Example 24 may include the apparatus of example 19 and/or some other example herein, wherein the port is further to correct, by the port, bit flips of ordered sets during L0 and the transition between ordered sets and data blocks based on redundancy.

Example 25 may include an apparatus comprising means to perform one or more elements of a method described in or related to any of examples 1-24, or any other method or process described herein.

Example 26 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 27 may include an apparatus comprising logic, modules, and/or circuitry to perform one or more elements of a method described in or related to any of examples 1-24, or any other method or process described herein.

Example 28 may include a method, technique, or process as described in or related to any of examples 1-24, or portions or parts thereof.

Example 29 may include an apparatus comprising: one or more processors and one or more computer readable media comprising instructions that, when executed by the one or more processors, cause the one or more processors to perform the method, techniques, or process as described in or related to any of examples 1-24, or portions thereof.

Example 30 may include a method of communicating in a wireless network as shown and described herein.

Example 31 may include a system for providing wireless communication as shown and described herein.

Example 32 may include a device for providing wireless communication as shown and described herein.

Example 33 is a method that includes identifying, by a port, an indication of a channel loss of a channel; determining that the channel loss of the channel is higher than a predetermined threshold value; and activating forward error correction (FEC) for the channel.

Example 34 may include the subject matter of example 33, and also include determining that the channel is to operate a high data rate; and activating FEC based on the determination that the channel loss is above a predetermined threshold and the determination that the channel is to operate at a high data rate.

Example 35 may include the subject matter of any of examples 33-34, and can also include identifying that a latency associated with the FEC is above a threshold latency value; and advertising, by the port based on whether the latency is above the threshold latency value, a Gen 4 or Gen 5 peripheral component interconnect-express (PCI-e) data rate.

Example 36 may include the subject matter of any of examples 33-35, wherein the channel latency is related to a distance between two components within the channel.

Example 37 may include the subject matter of any of examples 33-36, wherein the predetermined threshold value for channel loss is 30 decibels (dB).

Example 38 may include the subject matter of any of examples 33-37, and can also include transmitting one or more error correcting code bits embedded with a data block transmitted at predetermined intervals.

Example 39 may include the subject matter of any of examples 33-37, and can also include transmitting one or more error correcting code bits after every nth data block as a separate symbol from the nth data block.

Example 40 may include the subject matter of any of examples 33-39, and can also include correcting or causing to correct, by the port, bit flips of ordered sets during L0 and the transition between ordered sets and data blocks based on redundancy.

Example 41 is an apparatus that includes a channel that includes a plurality of components; and a port associated with the channel, the port to identify an indication of a channel loss of a channel; determine that the channel loss of the channel is higher than a predetermined threshold value; and activate forward error correction (FEC) for the channel.

Example 42 may include the subject matter of example 41, the port to determine that the channel is to operate a high data rate; and activate FEC based on the determination that the channel loss is above a predetermined threshold and the determination that the channel is to operate at a high data rate.

Example 43 may include the subject matter of any of examples 41-42, the port to identify that a latency associated with the FEC is above a threshold latency value; and advertise, by the port based on whether the latency is above the threshold latency value, a Gen 4 or Gen 5 peripheral component interconnect-express (PCI-e) data rate.

Example 44 may include the subject matter of any of examples 41-43, wherein the port is further to correct bit flips of ordered sets during L0 and the transition between ordered sets and data blocks based on redundancy.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus comprising:
   means to identify, by a port, an indication of a channel loss of a channel;
   means to identify, by the port, an indication of whether a receiver associated with the port desires forward error correction (FEC) for the channel;
   means to identify, by the port based on the indication of the channel loss and the indication of whether the receiver desires FEC, whether latency associated with the FEC is above an acceptability threshold; and
   means to identify, by the port based on whether the latency is above the acceptability threshold, whether to advertise a Gen 4 or Gen 5 peripheral component interconnect-express (PCI-e) data rate.

2. The apparatus of claim 1, whether the channel latency is related to a distance between two components within the channel.

3. The apparatus of claim 2, wherein one of the components of the two components is a retimer.

4. The apparatus of claim 1, wherein the indication of the channel loss is a bit that indicates that the channel loss above 30 decibels (dB).

5. The apparatus of claim 1, wherein error correction code is transmitted with data blocks at predetermined intervals.

6. The apparatus of claim 5, wherein error correction code is embedded into every nth data block.

7. The apparatus of claim 5, wherein error correction code is transmitted after every nth data block as separate symbols than the nth data block.

8. The apparatus of claim 1, further comprising means to correct, by the port, bit flips of ordered sets during L0 and the transition between ordered sets and data blocks based on redundancy.

9. A method comprising:
   identifying, by a port, an indication of a channel loss of a channel;
   determining that the channel loss of the channel is higher than a predetermined threshold value;
   determining that the channel is to operate at a high data rate; and
   activating forward error correction (FEC) for the channel based on the determination that the channel loss is above a predetermined threshold and the determination that the channel is to operate at a high data rate.

10. The method of claim 9, further comprising:
    identifying that a latency associated with the FEC is above a threshold latency value; and advertising, by the port based on whether the latency is above the threshold latency value, a Gen 4 or Gen 5 peripheral component interconnect-express (PCI-e) data rate.

11. The method of claim 10, wherein the channel latency is related to a distance between two components within the channel.

12. The method of claim 9, wherein the predetermined threshold value for channel loss is 30 decibels (dB).

13. The method of claim 9, further comprising transmitting one or more error correcting code bits embedded with a data block transmitted at predetermined intervals.

14. The method of claim 9, further comprising transmitting one or more error correcting code bits after every nth data block as a separate symbol from the nth data block.

15. One or more non-transitory computer-readable media comprising instructions to cause an apparatus, upon execution of the instructions by one or more processors of the apparatus, to:
identify, by a port, an indication of a channel loss of a channel;
identify, by the port, an indication of whether a receiver associated with the port desires forward error correction (FEC) for the channel;
identify, by the port based on the indication of the channel loss and the indication of whether the receiver desires FEC, whether latency associated with the FEC is above an acceptability threshold; and
identify, by the port based on whether the latency is above the acceptability threshold, whether to advertise a Gen 4 or Gen 5 peripheral component interconnect-express (PCI-e) data rate.

16. The one or more non-transitory computer-readable media of claim 15, wherein the channel latency is related to a distance between two components within the channel.

17. The one or more non-transitory computer-readable media of claim 15, wherein one of the components of the two components is a retimer.

18. The one or more non-transitory computer-readable media of claim 15, wherein the indication of the channel loss is a bit that indicates whether the channel loss is less than 30 decibels (dB) or between 30 and 35 dB.

19. The one or more non-transitory computer-readable media of claim 15 and/or some other example herein, wherein the instructions are further to correct, by the port, bit flips of ordered sets during L0 and the transition between ordered sets and data blocks based on redundancy.

20. An apparatus comprising:
a channel that includes a plurality of components; and
a port associated with the channel, the port to:
identify an indication of a channel loss of a channel;
determine that the channel loss of the channel is higher than a predetermined threshold value;
determine that the channel is to operate at a high data rate; and
activate forward error correction (FEC) for the channel based on the determination that the channel loss is above a predetermined threshold and the determination that the channel is to operate at a high data rate.

21. The apparatus of claim 20, the port to:
identify that a latency associated with the FEC is above a threshold latency value; and
advertise, by the port based on whether the latency is above the threshold latency value, a Gen 4 or Gen 5 peripheral component interconnect-express (PCI-e) data rate.

* * * * *